United States Patent [19]
Boutet et al.

[11] Patent Number: 5,124,550
[45] Date of Patent: Jun. 23, 1992

[54] APPARATUS FOR ORIENTING STORAGE PHOSPHOR CASSETTE

[75] Inventors: John C. Boutet, Rochester, N.Y.; Gary R. Unruh, Newark, Calif.

[73] Assignee: Eastman Kodak Company, Rochester, N.Y.

[21] Appl. No.: 621,189

[22] Filed: Nov. 30, 1990

[51] Int. Cl.⁵ .............................. G03B 42/02
[52] U.S. Cl. .................... 250/327.2; 206/455
[58] Field of Search ............... 206/455, 387, 493; 250/327.2 J, 327.2 D

[56] References Cited

U.S. PATENT DOCUMENTS

| | | | |
|---|---|---|---|
| Re. 31,847 | 3/1985 | Luckey | 250/327.2 |
| 4,216,857 | 8/1980 | Huang | 206/387 X |
| 4,235,334 | 11/1980 | Ahn | 206/387 |
| 4,480,423 | 11/1984 | Muller | 206/455 X |
| 4,810,874 | 3/1989 | Torii | 250/327.2 |
| 4,877,958 | 10/1989 | Agano et al. | 250/327.2 D |

Primary Examiner—Paul T. Sewell
Assistant Examiner—Jacob K. Ackun, Jr.
Attorney, Agent, or Firm—William F. Noval

[57] ABSTRACT

A storage phosphor reader includes apparatus for loading into the reader a storage phosphor plate carried in a cassette. Orienting surfaces are provided on the cassette and on a reader loading shelf to effect correct orientation of the cassette on the shelf. Thus, a storage phosphor plate can be properly transferred between the cassette and the reader.

3 Claims, 3 Drawing Sheets

APPARATUS FOR ORIENTING STORAGE PHOSPHOR CASSETTE

BACKGROUND OF THE INVENTION

1. Technical Field

This invention relates to photo-stimulable storage phosphor apparatus and more particularly to a storage phosphor reader having apparatus for correctly transferring a storage phosphor plate between a cassette and the reader.

2. Background Art

In a photo-stimulable storage phosphor imaging system, as described in U.S. Pat. No. Re. 31,847 reissued Mar. 12, 1985 to George W. Luckey, a photo-stimulable phosphor sheet is exposed to an imagewise pattern of short wavelength radiation, such as X-radiation, to record a latent image pattern in the photo-stimulable phosphor sheet. The latent image is read out by stimulating the phosphor with a relatively long wavelength stimulating radiation, such as red or infrared light. Upon stimulation, the photo-stimulable phosphor releases emitted radiation of an intermediate wavelength, such as blue or violet light, in proportion to the quantity of short wavelength radiation that was received. To produce a signal useful in electronic image processing, the photo-stimulable phosphor sheet is scanned in a raster pattern by a beam of light produced, for example, by a laser deflected by an oscillating or rotating scanning mirror, and the emitted radiation is sensed by a photodetector such as photomultiplier tube to produce the electronic image signal.

In applications in which the photo-stimulable storage phosphor sheet is exposed to X-radiation at one location and read out at another location, it is desirable that the photo-stimulable storage phosphor sheet not be exposed to undesirable light to prevent image degradation. It is also desirable that the storage phosphor sheet be protected from damage during handling between the exposure and read out stations. It has thus been proposed to support a storage phosphor in a rigid cassette to shield the storage phosphor from extraneous light and to protect it from damage. To assure that a storage phosphor is transferred properly into a reader for scanning the phosphor, it is desirable that the cassette be properly oriented relative to the reader. Moreover, where different size cassettes are used, it is desirable that each cassette be oriented in the same manner.

SUMMARY OF THE INVENTION

According to the present invention, there is provided a storage phosphor utilization apparatus such as a reader and a storage phosphor cassette which have complementary orienting means for effecting proper orientation of the cassette relative to the reader so that a storage phosphor plate is properly transferred between the cassette and the reader. According to an aspect of the present invention, the orienting means includes complementary orienting surfaces on the cassette and on a reader loading shelf. According to another aspect of the present invention, different size cassettes are oriented relative to the reader in the same manner.

BRIEF DESCRIPTION OF THE DRAWINGS

The invention is described with reference to the accompanying drawings wherein like elements are numbered with like numbers.

DESCRIPTION OF THE PREFERRED EMBODIMENTS

Figure 1:
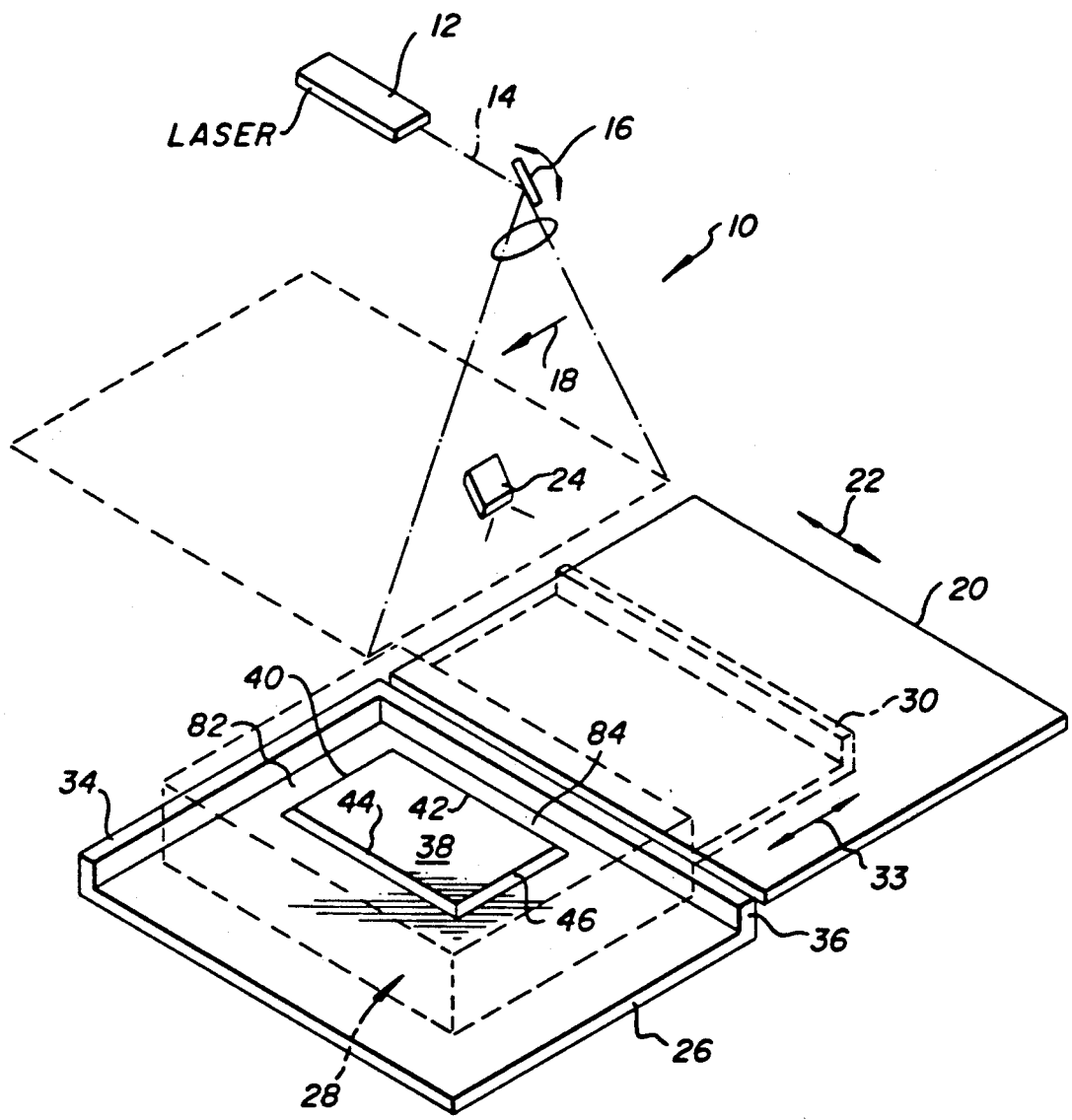
FIG. 1 is a diagrammatic, perspective view of a storage phosphor reader incorporating an embodiment of the present invention.

Referring now to the figures, there will be described a preferred embodiment of the present invention. As shown in FIG. 1, a storage phosphor reader 10 includes a laser 12 which produces a light beam 14. Beam 14 is deflected by oscillating mirror 16 in the scanning direction of arrow 18. A translation device 20 is moved in the direction of arrow 22 to move a photo-stimulable storage phosphor plate past scanning beam 14. A latent X-ray produced image stored in the storage phosphor is thus scanned in a raster pattern to produce an emitted radiation image which is detected by photodetector 24. The electrical image signal from photodetector 24 is stored, transmitted or converted to a visible image by a printer or a video monitor.

Figure 2:
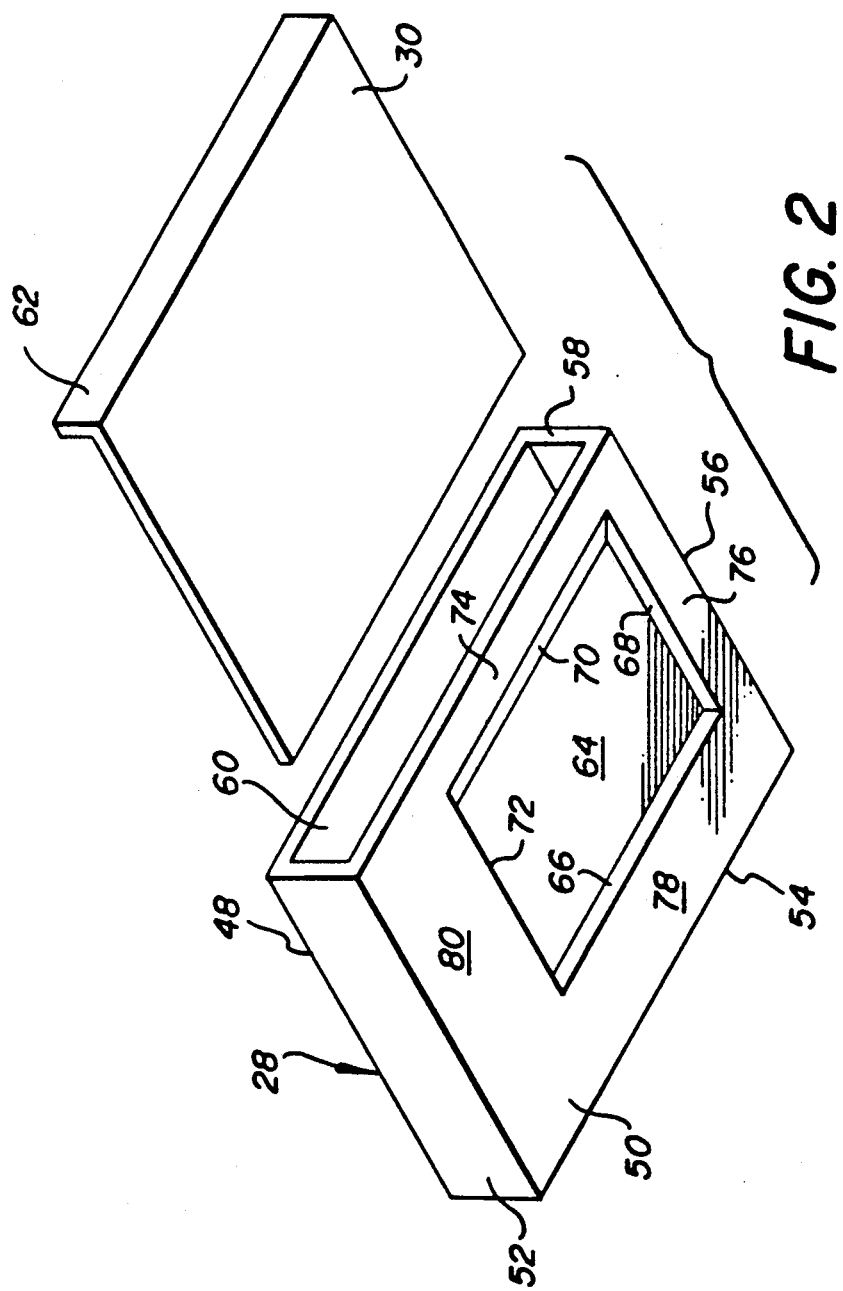
FIG. 2 is a perspective view of a cassette and storage phosphor supported in the cassette.

As shown in FIG. 1, reader 10 includes a shelf 26 for loading a cassette 28 (in dashed lines) containing a storage phosphor plate 30 (in dashed lines). Plate 30 is transferred in the direction of arrow 32 between cassette 30 and translation device 20 of reader 10. In order to orient cassette 28 properly relative to reader 10, shelf 26 includes reference members 34 and 36 and cassette orienting boss 38. Boss 38 has bevelled sides 40, 42, 44, 46. As shown in greater detail in FIG. 2, cassette 28 includes top wall 48, bottom wall 50, side walls 52, 54, 56 and open side 58. Walls 46, 48, 50, 52, 54 enclose a cavity 60 into which storage phosphor plate 30 is inserted. Rib 62 of plate 30 closes off the open side 58 of cassette 28 to provide a light tight enclosure for storage phosphor plate 28.

According to the invention, bottom wall 50 of cassette 28 is provided with a rectangular recess 64 having inwardly bevelled walls 66, 68, 70, 72. Recess 64 forms peripheral ribs 74, 76, 78, 80 in bottom wall 50. The width of ribs 74, 76 is less than ribs 78 and 80 to assure proper orientation of cassette 28 on shelf 26. Rib 76 is dimensioned to seat in the channel 82 between shelf reference wall 34 and wall 40 of boss 38. Similarly, rib 74 is dimensioned to seat in the channel 84 between shelf reference wall 36 and wall 42 of boss 38. If cassette 28 is reversed, ribs 80 and 78 will not seat correctly since they are larger than channels 82, 84.

Figure 3:
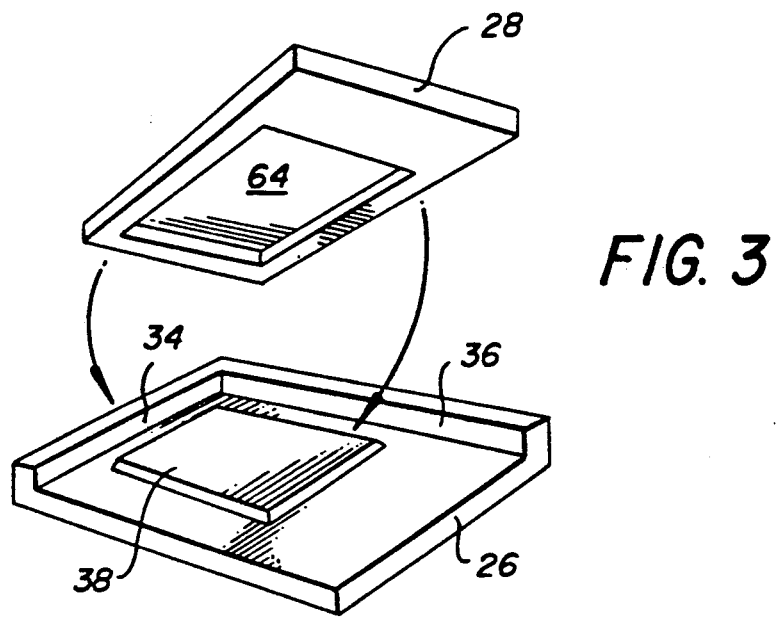
FIG. 3 is a diagrammatic perspective view showing the orienting surfaces of the embodiment of FIG. 1.

The proper orientation of cassette 28 relative to shelf 26 is shown in FIG. 3. When recess 64 is correctly mated with boss 38, cassette 28 is pushed against reference members 34, 36 and retained there so that storage phosphor plate 30 is correctly located for transfer to reader 10.

Figure 4:
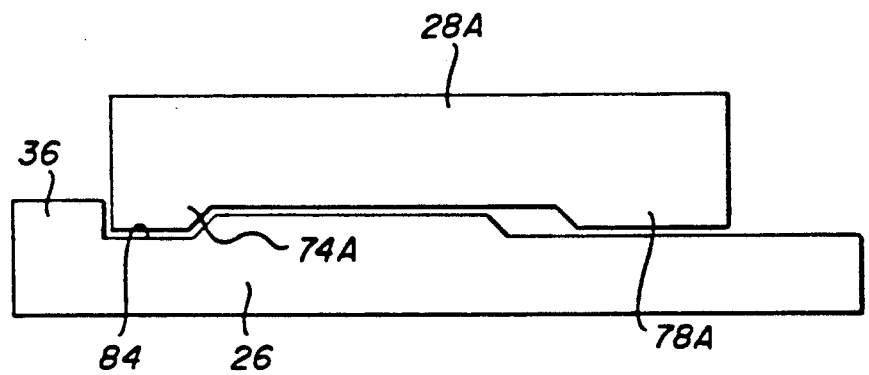
FIGS. 4 and 5 are respective side, elevational views of two differently sized cassettes properly oriented on the reader loading shelf.
Figure 5:
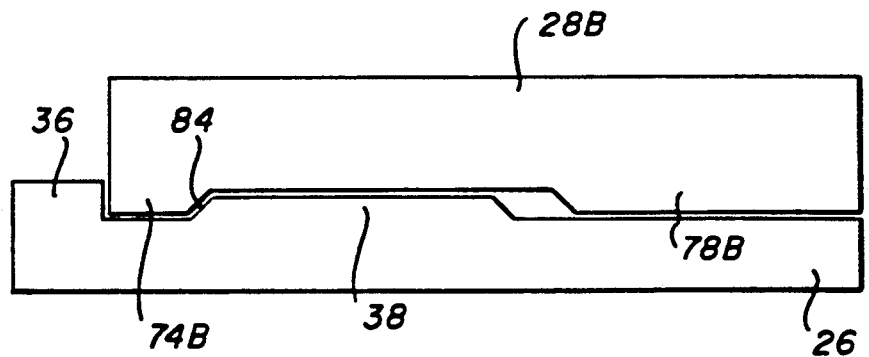

FIGS. 4 and 5 depict different sized cassettes seated on shelf 26. Although the cassette 28A of FIG. 4 is smaller than the cassette 28B of FIG. 5, both cassettes have similarly dimensioned orienting ribs 74A and 74B respectively which seat in channel 84. Ribs 78A and 78B are larger than respective ribs 74A and 74B to ensure proper orientation of cassettes 28A, 28B on shelf 26.

Although this invention has been described in detail with particular reference to a preferred embodiment thereof, it will be understood that variations and modifications can be effected within the spirit and scope of the invention. Thus, the size and configuration of the complementary cassette recess and shelf boss are illustrative and may take any size or configuration to effect proper orientation of the cassette on the shelf. The cassette loading shelf may be associated with a storage phosphor erase station or other storage phosphor utilization apparatus. Moreover, cassette 28 may take a different configuration. For example, the plate 30 could form the bottom of a cassette having an open bottom. In such case, the orienting surface can be provided on other complementary surfaces of the cassette and reader loading shelf.

What is claimed is:

1. In a storage phosphor reader including, means for scanning a light beam in a scanning direction, means for transporting a storage phosphor plate past said scanning light beam in a direction perpendicular to said scanning direction, so that a latent image stored in said storage phosphor plate is scanned in a raster pattern to produce an emitted radiation image, and means for detecting the emitted radiation image and for producing an electrical image signal; storage phosphor cassette orientation apparatus comprising:

a shelf located adjacent to said storage phosphor reader for receiving a cassette containing a removable flat storage phosphor plate;

reference members on said shelf defining a reference corner for a received cassette;

an upstanding boss on said shelf spaced from said reference members and forming intersecting channels therewith; and a storage phosphor cassette including a removable storage phosphor plate, said cassette having a bottom wall with a recess which forms peripheral ribs in said bottom wall which intersect and are dimensioned to seat in said intersecting channels of said shelf so as to properly orient said cassette on said shelf, so that said storage phosphor plate may be removed from said cassette into said reader and replaced in said cassette after being read.

2. The apparatus of claim 1 wherein said recess on said bottom of said cassette froms intersecting peripheral ribs of different dimensions so that said cassette will only seat properly in one orientation on said shelf.

3. The apparatus of claim 1 wherein different sized cassettes can be seated on said shelf, and wherein each of said different sized cassettes have bottom walls with recesses which define similarly dimensioned orienting ribs respectively which seat in said intersecting channels of said shelf.

* * * * *